M. PARKER.
DETACHABLE BLADE KNIFE.
APPLICATION FILED AUG. 7, 1915.
Reissued Jan. 25, 1916. 14,054.
Fig. 1,
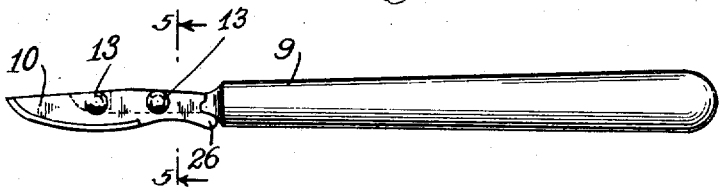
Fig. 2,
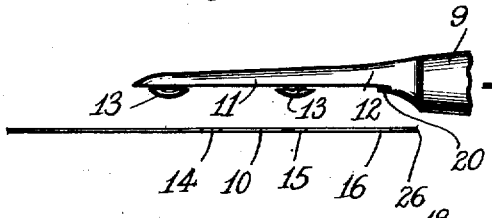
Fig. 3,
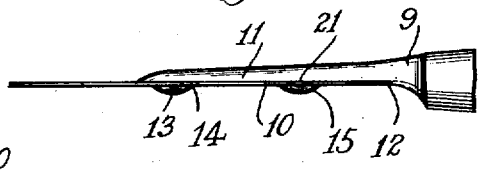
Fig. 4,
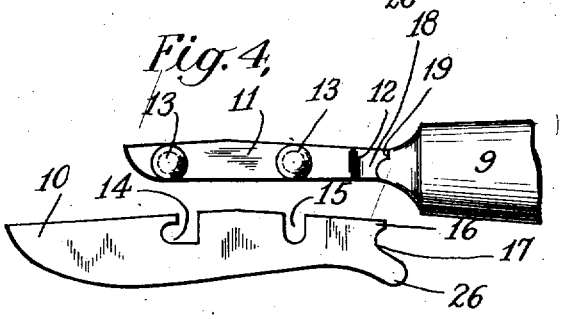
Fig. 5,
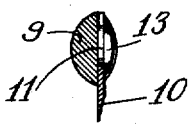
Fig. 6,
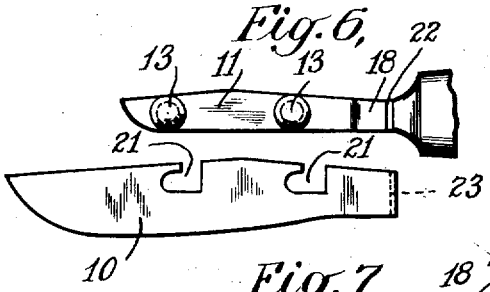
Fig. 8,
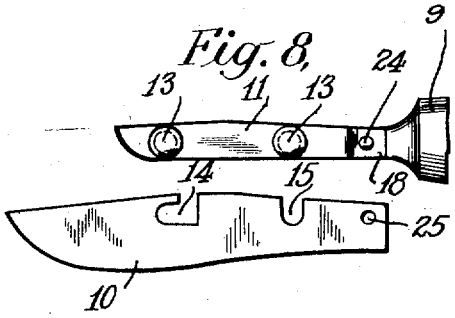
Fig. 7,
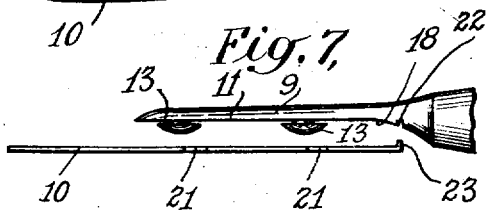
INVENTOR
Morgan Parker
BY
Pennie Davis Marvin
ATTORNEYS

UNITED STATES PATENT OFFICE.

MORGAN PARKER, OF NEWPORT, RHODE ISLAND.

DETACHABLE-BLADE KNIFE.

14,054. Specification of Reissued Letters Patent. Reissued Jan. 25, 1916.

Original No. 1,139,796, dated May 18, 1915, Serial No. 833,347. Application for reissue filed August 7, 1915. Serial No. 44,353.

*To all whom it may concern:*

Be it known that I, MORGAN PARKER, a citizen of the United States, residing at Newport, county of Newport, and State of Rhode Island, have invented certain new and useful Improvements in Detachable-Blade Knives; and I do hereby declare the following to be a full, clear, and exact description of the invention, such as will enable others skilled in the art to which it appertains to make and use the same.

This invention relates to detachable blade knives and is directed to the provision of an improved construction for a knife of this character whereby a thin flexible blade may be readily secured to a handle and held thereon so rigidly as to preclude accidental detachment of the blade from the handle or movement of the blade upon the handle.

The invention is susceptible of use in knives varying widely in their construction and in the uses for which they are adapted, but it is of special utility in knives for surgical work, such for instance as knives of the type known as surgeons' scalpels.

The invention involves the provision of a knife consisting of a metallic handle of a shape specially adapted for the use for which the knife is designed and a detachable blade made from a thin flexible strip of sheet-metal. In accordance with the invention the handle is provided with a suitable supporting surface against which the blade is held by securing devices on the handle arranged to engage the blade, the supporting surface and the securing devices being such that the blade, when mounted in position on the handle, is flexed in the direction of its length. To this end, the supporting surface upon the handle is made flat throughout the major portion of its length and at its inner end is inclined slightly relative to the length of the handle so that when the blade is locked upon the handle in contact with this supporting surface throughout the length of the surface, the blade will be flexed in the direction of its length and held under tension. For the purpose of securing the blade to the handle, headed studs are preferably provided on the handle adapted to coact with suitable slots in the blade. When such headed studs and slots are employed, the blade may be readily secured upon the handle and when in position will be held so rigidly as to preclude the possibility of movement relative to the handle, the tension to which the blade is subjected by being flexed as above set forth aiding materially in holding the blade rigidly in position. When such headed studs on the handle and slots in the blade are employed as the securing means for the blade, a retainer is provided for holding the blade against movement in the direction to detach it from the handle. Such a retainer may be readily provided in combination with the means for flexing the blade by arranging a portion of the blade to become latched behind a wall or projection on the supporting surface of the handle.

I have illustrated the preferred embodiment of my invention in the accompanying drawings, in which—

Figure 1 is a side view of a surgeon's scalpel employing my improved detachable blade. Fig. 2 is a top view of the end of the handle with the blade detached therefrom. Fig. 3 is a similar view with the blade mounted on the handle. Fig. 4 is a side view of the end of the handle with the blade detached therefrom. Fig. 5 is a transverse section of the handle and blade. Fig. 6 is a view similar to Fig. 4 illustrating a modified form in which the invention may be employed. Fig. 7 is a view similar to Fig. 2, showing the Fig. 6 construction, and Fig. 8 is a view similar to Figs. 4 and 6, illustrating a further modification.

Referring to these drawings, the knife consists of a handle 9 and a detachable blade 10. The handle 9 may be of such shape as is required by the use for which the knife is designed; the drawings show a form which is specially desirable in a surgeon's scalpel. At its end the handle is reduced in cross-sectional size and is provided with a supporting surface 11 against which the blade 10 is held by the securing means. This surface 11 is flat throughout the major portion of its length, that is, from the end of the handle to a point distant therefrom as, for instance, at 12. Beyond this point 12 the supporting surface against which the blade lies is inclined slightly. Projecting outwardly from the supporting surface 11 are two headed studs 13.

The blade 10 is made from thin sheet-metal and possesses a slight amount of flexibility. It is of the shape required by the use for which the knife is designed, such, for instance, as that shown in Fig. 1. In the blade 10 are two slots which open at the rear edge of the blade. One of these slots 14 is of L-shape and the other 15 is straight as shown in Fig. 4. These slots 14 and 15 and the headed studs 13 constitute the securing means for mounting the blade upon the handle.

A retainer is provided for preventing movement of the blade in a direction to detach it from the handle while the knife is in use. For this purpose the inner end of the blade is shown as provided with a projection 16 formed by cutting out the metal at the end of the blade as shown at 17. Also, the supporting surface of the handle against which the blade lies is provided with a wall adapted to coact with this projection 16. The inclined portion 18 of the supporting surface of the handle is cut away at 19 (Fig. 4) so as to provide a wall 20 (Fig. 2) to coact with the projection 16. The metal at the inner end of the blade at the other side of the depression 17 is preferably extended as shown at 26 to form a finger-piece which may be grasped in order to detach the blade from the handle.

With the parts constructed as above described, the blade may be laid against the supporting surface of the handle and moved so that the slot 14 in the blade will coact with the corresponding stud 13. The blade may then be turned about this stud as a pivot until the slot 15 comes into coaction with its stud. While the blade is being moved thus, the proportion 16 and the end of the blade adjacent thereto move into contact with the inclined portion 18 of the supporting surface. The distance between the heads of the studs 13 and the supporting surface 11 is practically the same as the thickness of the blade 10, so that the blade is held by the heads of the studs in close contact with the wall 11. Also, the inclination of the inner end of the supporting surface for the blade causes the blade to be flexed in the direction of its length and transverse to its general plane when it is held by the studs 13 in close contact with the wall 11. This flexing of the blade is such that as the blade is moved into position, the projection 16 at the end of the blade snaps over the wall 20 and its edge lies against that wall, the parts being so made that when this takes place the ends of the slots 14 and 15 are in contact with the studs 13. In this way, the blade will be held rigidly upon the handle in such a manner as will preclude the possibility of unintentional detachment of the blade from the handle or movement of the blade upon the handle. When it is desired to remove the blade, this may be readily done by pressing on the extension 26 with sufficient force to raise the projection 16 above wall 20, whereupon the blade may be turned about the outer stud 13 as a pivot.

In Figs. 6 and 7, a slightly modified construction is shown involving the use of two slots 21 in the blade 10 which slots are of angular shape. In this form of the invention the supporting wall for the blade is flat throughout the major portion of its length as shown at 11, and is slightly inclined at its inner end as shown at 18. At the upper end of this inclined portion 18 is a slot 22 extending across the handle. The blade 10 has its inner end turned as shown at 23 to form a projection adapted to coact with the slot 22. This form of blade is laid against the supporting surface with the projection 23 on the inclined surface 18 and moved edgewise to cause it to coact with the studs 13. This having been done, the blade is moved lengthwise to carry the studs to the ends of slots 21 and when the studs reach the ends of the slots the projection 23 drops into the slot 22. In this way the blade is flexed in the direction of its length, it is held in position against the supporting wall and it is retained by projection 23 and slot 22 against movement in a direction to effect disengagement of the securing means. In order to engage with the retaining mechanism the blade is automatically flexed by the retaining mechanism as it is moved along upon the supporting surface. This condition of flexure of the blade is a condition through which the blade must pass before and in order to gain its final position upon the support whereupon the portion 23 of the blade drops behind the abrupt wall at the end of the raised part 18 of the supporting surface and the flexure of the blade is relieved. The blade is then locked mechanically upon the supporting surface and to detach it requires that the blade be flexed to raise the portion 23 thereof from behind the abrupt end of the raised part 18.

In Fig. 8, a construction is shown similar in all respects to that shown in Figs. 1 to 5, except as to the retaining means. In Fig. 8 the inclined portion 18 of the supporting surface of the handle is shown as provided with a stud 24. This stud is adapted to enter an opening 25 formed in the blade 10 so that when the blade is moved into position in coaction with the studs 13 the inner end of the blade will snap over the projection 24 and come in contact with the inclined portion 18 of the supporting surface.

I claim:

1. A detachable blade knife comprising a handle, a blade-supporting member projecting from one end of the handle in substantial continuation of the handle and having a blade-supporting surface which is flat throughout the major portion thereof and is inclined in the direction of its length at the end thereof adjacent to the handle, a thin flexible blade, and means for securing the blade to the handle in contact with said surface and flexed in the direction of its length by the shape of said surface; substantially as set forth.

2. A detachable blade knife comprising a handle, a blade-supporting member projecting from one end of the handle and having a blade-supporting surface which is flat throughout the major portion thereof and is inclined in the direction of its length at its end adjacent to the handle, a thin flexible blade, means for securing the blade to the handle in contact with said surface and flexed in the direction of its length by the shape of the surface, and a retainer for preventing disengagement of the blade from said securing means; substantially as set forth.

3. A detachable blade knife comprising a handle having a blade-supporting surface at one end which is flat throughout the major portion thereof and is inclined at one end, headed studs projecting from said surface, and a thin flexible blade having slots therein opening at the rear edge of the blade, said blade being adapted to be held by the headed studs in flexed condition in contact with the flat and inclined portions of said surface; substantially as set forth.

4. A detachable blade knife comprising a handle having a blade-supporting surface at one end which is flat throughout the major portion thereof and is inclined at one end, headed studs projecting from said surface, a thin flexible metallic blade having slots therein to coact with said studs, said blade being adapted to be held in contact with the flat and inclined portions of said surface by said studs, and coacting parts on the handle and blade for preventing movement of the blade to detach it from the studs; substantially as set forth.

5. A detachable blade knife comprising the combination of a handle having a supporting surface thereon which is flat throughout its major portion and inclined at one end, headed studs projecting from said surface, a thin flexible blade slotted to coact with said studs and adapted to be held against the flat and inclined portions of said surface in flexed condition by said studs, and a retainer for holding the blade against movement in a direction to detach it from the handle consisting of coacting parts on the blade and handle which are brought into coaction by movement of the blade into position upon the supporting surface and which are held in engagement by the tension of the blade; substantially as set forth.

6. A detachable blade knife comprising a handle having a blade-supporting surface which is flat throughout the major portion thereof and the minor portion of which is inclined relatively to said flat portion, a thin flexible blade, and means for securing the blade to the handle in contact with said surface and flexed in the direction of its length by the shape of said surface by movement of the blade upon said surface while the blade is in flexed condition; substantially as set forth.

7. A detachable blade knife comprising a handle having a blade-supporting surface which is flat throughout the major portion thereof and the minor portion of which is inclined relatively to said flat portion in the direction of the length of the surface, a thin flexible blade, means for securing the blade to the handle in contact with said surface and flexed in the direction of its length by the shape of said surface by movement of the blade upon said surface while the blade is in flexed condition and retaining means dependent upon the flexure of the blade for holding the blade in coaction with the securing means; substantially as set forth.

8. A detachable blade knife comprising a handle having a blade-supporting surface, undercut blade-securing means projecting upwardly from the blade-supporting surface, a blade which is flexible in the direction of its length and which has edges adapted to coact with the undercut securing means as the blade is moved upon the supporting surface, means for flexing the blade solely in a longitudinal direction and transverse to its general plane as it is moved upon the supporting surface into coaction with the securing means, and retaining means for holding the blade against movement in the direction of its length to disengage it from the securing means and requiring that the blade be flexed longitudinally and transverse to its general plane to effect such disengagement; substantially as set forth.

9. A detachable blade knife comprising a handle having a blade-supporting surface, blade-securing means upstanding upon said surface and provided with undercut recesses, a longitudinally flexible blade shaped for coaction with the recesses of the securing means and adapted to be secured upon the blade-supporting surface by movement in the direction of its length upon said surface, means for flexing the blade solely in a longitudinal direction and transverse to its general plane as it is so moved upon the supporting surface in coaction with the securing means and retaining means for holding the blade in the position to which it is moved, said retaining means being dependent upon the flexure of the blade caused by its movement upon the supporting surface and requiring that the blade be flexed longitudinally and transverse to its general plane to permit its detachment from the handle; substantially as set forth.

10. A detachable blade knife comprising a handle having a blade-supporting surface, undercut blade-securing means projecting upwardly from the blade-supporting surface, a longitudinally flexible blade having edges adapted to coact with the undercut securing means as the blade is moved upon the supporting surface, means for automatically flexing the blade solely in a longitudinal direction and transverse to its general plane as the blade is moved upon the supporting surface into coaction with the securing means and before gaining its final position upon the supporting surface, and retaining means for holding the blade against movement in a direction to disengage it from the securing means rendered operative by release of the flexure of the blade and requiring that the blade be reversely flexed longitudinally and transverse to its general plane to effect such disengagement; substantially as set forth.

11. A detachable blade knife comprising a handle having a blade-supporting surface, a projection upstanding upon said surface and having grooves at its sides, a longitudinally flexible metallic blade having edges for coaction with said grooves and adapted to be secured upon said surface by a lengthwise movement of the blade upon the surface carrying said edges into the coacting grooves, and coöperating parts upon the blade and surface including walls extending transversely of the blade and surface arranged to cause flexure of the blade solely in the direction of its length and transverse to its general plane as it is moved upon the supporting surface and then become interlocked by relieving the said longitudinal flexure of the blade to lock the blade against movement; substantially as set forth.

12. A detachable blade knife comprising a handle having a blade-supporting surface, two headed studs rising from said surface, a longitudinally flexible blade having edges for coaction with said studs, means for causing flexure of the blade solely in the direction of its length and transverse to its general plane as the blade is moved in the direction of its length upon the supporting surface to carry said edges into coaction with the studs, and transverse walls on the blade and surface brought into coaction by relieving the longitudinal flexure of the blade to lock the blade against movement and requiring that the blade be flexed longitudinally and transverse to its general plane to permit its detachment from the handle.

In testimony whereof I affix my signature.

MORGAN PARKER.